(12) United States Patent
Hou et al.

(10) Patent No.: US 11,555,971 B2
(45) Date of Patent: Jan. 17, 2023

(54) APPARATUS AND METHOD FOR COUPLING THE SPATIAL LIGHT TO THE OPTICAL FIBER LIGHT FOR ACHIEVING THE STABILITY OF AN OPTICAL AXIS WITHOUT A POSITION DETECTOR

(71) Applicants: Shanghai Institute of Optics and Fine Mechanics, Chinese Academy of Sciences, Shanghai (CN); Shanghai Zhongke Shenguang Optoelectronic Industry Co., Ltd., Shanghai (CN)

(72) Inventors: Peipei Hou, Shanghai (CN); Jianfeng Sun, Shanghai (CN); Zhiyong Lu, Shanghai (CN); Yu Zhou, Shanghai (CN); Yiqun Wang, Shanghai (CN); Lijuan Wang, Shanghai (CN); Yueli Xi, Shanghai (CN)

(73) Assignees: SHANGHAI INSTITUTE OF OPTICS AND FINE MECHANICS, CHINESE ACADEMY OF SCIENCES, Shanghai (CN); SHANGHAI ZHONGKE SHENGUANG OPTOELECTRONICS INDUSTRY CO., LTD., Shanghai (CN)

( * ) Notice: Subject to any disclaimer, the term of this patent is extended or adjusted under 35 U.S.C. 154(b) by 58 days.

(21) Appl. No.: 17/271,250

(22) PCT Filed: Aug. 28, 2019

(86) PCT No.: PCT/CN2019/103126
§ 371 (c)(1),
(2) Date: Feb. 25, 2021

(87) PCT Pub. No.: WO2020/043142
PCT Pub. Date: Mar. 5, 2020

(65) Prior Publication Data
US 2021/0341689 A1 Nov. 4, 2021

(30) Foreign Application Priority Data

Aug. 29, 2018 (CN) .................. CN201810997722

(51) Int. Cl.
*G02B 6/42* (2006.01)

(52) U.S. Cl.
CPC ......... *G02B 6/4225* (2013.01); *G02B 6/4227* (2013.01)

(58) Field of Classification Search
None
See application file for complete search history.

(56) References Cited

U.S. PATENT DOCUMENTS

| 5,062,150 A | 10/1991 | Swanson et al. |
| 6,577,421 B1 | 6/2003 | Cheng et al. |
| 2001/0005273 A1 | 6/2001 | Fischer et al. |

FOREIGN PATENT DOCUMENTS

| CN | 102681550 A | 9/2012 | |
| CN | 104811244 A | 7/2015 | |
| CN | 106772837 A | 5/2017 | |
| JP | 2016184561 A | 10/2016 | |
| WO | WO-2017000364 A1 * | 1/2017 | ............. G01B 11/24 |

OTHER PUBLICATIONS

Int'l Search Report dated Nov. 28, 2019 in Int'l Application No. PCT/CN2019/103126.

(Continued)

*Primary Examiner* — Omar R Rojas
(74) *Attorney, Agent, or Firm* — Panitch Schwarze Belisario & Nadel LLP

(57) ABSTRACT

An apparatus and method herein efficiently couple spatial light to optical fiber light for achieving stability of an optical axis without a position sensor. The basic concept of the method includes: first, obtaining, according to a theoretical coupling efficiency model, a model parameter by means of fitting calculation; second, using a four-point tracking algorithm to calculate an optical fiber nutation trajectory accord- (Continued)

ing to the optical fiber nutation principle; and finally, using the nutation trajectory to calculate the position deviation of a central point. The optical axis is ensured to be stable by correcting the position deviation, and the high coupling efficiency remains. The method is used for the stability of the optical axis in a space coherent laser communication DPSK link. The high efficiency coupling is a key technology of long-distance, high bit rate transmission in space laser communication, and is significant in the development of inter-satellite optical communications.

19 Claims, 2 Drawing Sheets

(56) References Cited

OTHER PUBLICATIONS

Office Action dated Mar. 25, 2022 in Japanese Application No. 2021-536137.
Toyoshima et al., "Maximum fiber coupling efficiency and optimum beam size in the presence of random angular jitter for free-space laser systems and their applications", J. Opt. Soc. Am. A., vol. 23, No. 9, pp. 2246-2250, Sep. 2006.
Jianqiu et al., "Coupling Method for Making Space Light into Single-Mode Fiber Based on Laser Nutation", Chinese Journal of Lasers, vol. 43, No. 8, 8 pages, Aug. 2016.

\* cited by examiner

APPARATUS AND METHOD FOR COUPLING THE SPATIAL LIGHT TO THE OPTICAL FIBER LIGHT FOR ACHIEVING THE STABILITY OF AN OPTICAL AXIS WITHOUT A POSITION DETECTOR

CROSS-REFERENCE TO RELATED APPLICATIONS

This application is a Section 371 of International Application No. PCT/CN2019/103126, filed Aug. 28, 2019, which was published in the Chinese language on Mar. 5, 2020 under International Publication No. WO 2020/043142 A1, which claims priority under 35 U.S.C. § 119 to Chinese Patent Application No. 201810997722.7, filed on Aug. 29, 2018 the disclosures of all of which are incorporated herein by reference.

TECHNICAL FIELD

The invention relates to a method of efficiently coupling spatial light to optical fiber light without a position detector for obtaining a stable optical axis, which can realize coupling the spatial light to optical fiber light with function of automatic tracking always remaining high coupling efficiency, which is a key technology for high code rate, miniaturization, light weight and low power consumption within long-distance spatial coherent laser communication.

BACKGROUND

The free spatial laser with laser beam as the information carrier has the advantage of high communication frequency, good spatial and temporal coherence, and narrow emission beam, which is an effective means to solve the bottleneck of microwave communication, build a space-based broadband network, and realize global high-speed, real-time communication, which has great potential for civilian and military application.

Space coherent laser communication is the only technical means to achieve data transmission in the rate above G bit/s in free space long-distance communication. Coherent laser communication based on self-heterodyne and heterodyne detection methods has high detection sensitivity, and is a key system to achieve high code rate, miniaturization, light weight and low power consumption long-distance laser communication terminal. For coherent laser communication, the self-heterodyne detection method needs to couple the space laser into a single-mode fiber. Therefore, how to make spatial laser and single-mode fiber couple, and make the coupling space laser to space laser coupling with always remaining high coupling efficiency is a key technology of high code rate, miniaturization, light weight and low power long-distance s pace coherent laser communication.

In a space coherent laser communication DPSK link, the method is used for stability of the optical axis of space laser and optical fiber light without a position detector, which has effectively improved the coupling efficiency of space lasers, and is a new exploration of high code rate space laser coherent communication technology, which is of great significance to the development of my country's satellite-to-ground communication terminal. Existing solutions refer to literature (1), Morio Toyoshima "Maximum fiber coupling efficiency and optimum beam size in the presence of random angular jitter for free space laser systems and their applications," J. Opt. Soc. Am. A, 2006, 23(9), (2) Gao Jianqiu, Sun Jianfeng, Li Jiawei, Zhu Ren, Hou Peipei, Chen Weibiao, Coupling method of spatial light to single-mode fiber based on laser nutation. *China Laser*, 2016, 43 (8)

SUMMARY OF INVENTION

The purpose of the present invention is to provide a device and method of efficiently coupling spatial light to optical fiber light without a position detector for obtaining a stable optical axis, which can realize the automatic tracking function of a system. The basic idea is as follows: firstly, through the mode field matching, the coupling efficiency model parameters are calculated by fitting. Secondly, according to the principle of fiber nutation, a four-point tracking algorithm is used to calculate the fiber nutation trajectory. And finally, the nutation trajectory is used to calculate the position deviation of the center point, and the position deviation is corrected to ensure the stability of the optical axis, and a high coupling efficiency. The technical solution of the present invention is as follows:

a method of coupling spatial light to optical fiber light without a position detector for obtaining a stable optical axis, which is applied to a device comprising an optical fiber coupler and a two-dimensional fast scanning galvanometer, wherein the method comprises at least the following steps:

Step S002: the optical fiber coupler is nutated under action of an amplified orthogonal sine signal, and the two-dimensional fast scanning galvanometer is deflected to two preset positions in x-direction and y-direction under constant voltage, and an output coupling optical power of each position is collected respectively, and x-axis and y-axis trajectories on a nutation circumference are obtained according to the optical power;

Step S003: the optical fiber coupler is nutated under the action of the amplified orthogonal sine signal, an optical power signal is collected every preset nutation period, and a position error signal is obtained according to the collected optical power signal and its corresponding coordinate value; and Step S004: an optical path is adjusted according to the position error signal, thereby obtaining the stable optical axis.

Preferably, before the step S002, the method further comprises:

Step S001: coupling model parameters are obtained; the step S001 comprises at least the following steps:

S001a: the two-dimensional fast scanning galvanometer keeps still in the y-direction, and performs a triangular wave scan in the x-direction, then the optical power signal of the optical fiber coupler is collected; the two-dimensional fast scanning galvanometer keeps still in the x-direction, and performs a triangle wave scan in the y-direction to collect the optical power signal of the optical fiber coupler;

S001b: substituting the optical power signal collected twice in S001a and the position signal of the two-dimensional fast scanning galvanometer corresponding to each signal point into an equation to calculate coupling model parameters.

Preferably, the following steps are included in the method after step S001 and before step S002:

S002a: a signal transmitting module is controlled to transmit two orthogonal sine signals;

S002b: a drive signal control board divides an input signal into four amplified sine signals which are orthogonal for each group of two sine signals;

S002c: the drive signal control board loads the signals onto the optical fiber coupler via electric wires, and the optical fiber coupler is nutated under action of the amplified orthogonal sine signals.

Preferably, the step S003 comprises at least one of the following steps:

S003a: an input signal board is controlled to transmit two orthogonal sine signals;

S003b: a signal drive board divides an input signal into four orthogonal amplified sine signals which are orthogonal for each group of two sine signals;

S003c: the signal drive board loads signals onto the optical fiber coupler via electric wires, and the optical fiber coupler is nutated under action of the amplified orthogonal sine signals;

S003d: an optical power signal is collected every a quarter of nutation period;

S003e: substituting the collected optical power signal and its corresponding coordinate value into an equation to obtain a position error signal.

Preferably, the amplitude of the sine signal emitted by a drive signal generator in step S002a is in a range of 1V-2.5V, and a frequency is in a range of 1 kHz-5 kHz.

Preferably, the voltage amplifier in step S002c amplifies a voltage into 100V-200V.

Preferably, a calculated x-axis trajectory is:

$$x = \frac{\left[\frac{1}{2} \cdot \ln\frac{P_{outx_1}}{P_{outx_2}} \cdot \omega_0^2 + x_1^2 - x_2^2\right]}{2 \cdot (x_1 - x_2)};$$

And a y-axis trajectory is:

$$y = \frac{\left[\frac{1}{2} \cdot \ln\frac{P_{outy_1}}{P_{outy_2}} \cdot \omega_0^2 + y_1^2 - y_2^2\right]}{2 \cdot (y_1 - y_2)};$$

Wherein, $x_1$, $x_2$ are x coordinates of the two preset positions in the x-direction, $y_1$, $y_2$ are the y coordinates of two preset positions in the y-direction, $\omega_0$ is a coupling model parameter, $P_{outx_1}$ is an output optical power corresponding to the position $x_1$, $P_{outx_2}$ is an output optical power corresponding to the position $x_2$, $P_{outy_1}$ is an output optical power corresponding to the position $y_1$, and $P_{outy_2}$ is an output optical power corresponding to the position $y_2$.

Preferably, error positions are:

$$\Delta x = \ln\frac{P_{outx_1}}{P_{outx_2}} \cdot \frac{\omega_0^2}{8Rx_1}$$

$$\Delta y = \ln\frac{P_{outy_1}}{P_{outy_2}} \cdot \frac{\omega_0^2}{8Ry_1}$$

Wherein, $Rx_1$ is the x coordinate on the x-direction trajectory, $Ry_1$ is the coordinate on the y-direction trajectory, $\omega_0$ is the coupling model parameter, $P_{outx_1}$ is an output optical power corresponding to the position $Rx_1$, $P_{outx_2}$ is an output optical power corresponding to the position $Rx_2$, $P_{outy_1}$ is an output optical power corresponding to the position $Ry_1$, and $P_{outy_2}$ is an output optical power corresponding to the position $Ry_2$.

Preferably, before step S003 or step S002, the method further comprises:

Step S000: a time delay of the two-dimensional fast scanning galvanometer is calibrated; specifically, Step S000 comprises the following steps:

Step S000a: a sine signal $K=\sin(\theta_1)$ in the X and Y directions of a fast steering mirror is loaded respectively;

Step S000b: when the optical fiber is not nutating, a sine optical power $G=\sin(\theta_2)$ output by an optical fiber nutator is calculated due to the scanning of the fast steering mirror.

Step S000c: by calculating a phase difference between K and G $$\Delta = \theta_1 - \theta_2$$

A delay time of the fast steering mirror can be obtained.

The present invention also provides a device of coupling spatial light to optical fiber light without a position detector for obtaining a stable optical axis, which is configured to perform the above method of coupling spatial light to optical fiber light without a position detector for obtaining a stable optical axis.

The present invention also provides a device of coupling spatial light to optical fiber light without a position detector for obtaining a stable optical axis, which comprises a laser (01), a beam collimator (02), a two-dimensional fast scanning galvanometer (03), a converging lens group (04), an optical fiber coupler (05), a drive signal control board (06), a signal transmitting module (07), a bridge (08), a detector (09), and a data acquisition board (10).

The laser (01) is connected to a port of the beam collimator (02) through an optical fiber. The emergent light of the beam collimator (02) is incident on the two-dimensional fast scanning galvanometer (03) at an angle of 45 degrees. The light beam reflected by the two-dimensional fast scanning galvanometer (03) converges to an optical center of the converging lens group in parallel and is incident into the converging lens group (04). The focal point of an emergent light beam of the converging lens group (04) is incident on an end of the optical fiber coupler (05). The signal transmitted by the signal transmitting module (07) is transferred to the drive signal control board (06) through coaxial cables. The drive signal control board (06) loads the signal onto the optical fiber coupler (05) via electric wires. The optical power coupled by the optical fiber coupler (05) enters the bridge (08) via the optical fiber. An optical signal of the bridge (08) enters the detector (09) via the optical fiber. An electrical signal of the detector (09) enters the data acquisition board (10) via coaxial wires.

Preferably, the optical fiber coupler (05) comprises an optical fiber (11) and a piezoelectric ceramic tube (12).

Preferably, the optical fiber (11) passes through the piezoelectric ceramic tube (12) and is fixed with the piezoelectric ceramic tube (12).

Preferably, the piezoelectric ceramic tube (12) includes four electrode regions (13), and electric wires (14) are welded on each of the four electrode regions (13).

Preferably, the signal transmitting module (07) is a signal generator.

Preferably, the drive signal control board (06) is a voltage amplifier.

The present invention also provides an optical fiber coupler which comprises an optical fiber, a piezoelectric ceramic tube, a coupling base, and a electric wire;

the optical fiber is structured as a capillary with a ferrule;

the outside of the piezoelectric ceramic tube is divided into several strip electrode regions, which are insulated from each other;

the coupling base has holes;

the optical fiber is embedded in the piezoelectric ceramic tube, a bottom end of the piezoelectric ceramic tube is fixed to the coupling base, one electric wire extends from each electrode region of the piezoelectric ceramic tube close to the base portion, and the other end of the electric wire passes through the hole on the base.

Preferably, an end of one end of the optical fiber has an end cap coating with high permeability film;

Preferably, the number of strip electrode regions outside the piezoelectric ceramic tube is four;

Specifically, the above equation and its derivation process are as follows:

1) The Coupling Model Parameters Solving:

Based on optical fiber coupling efficiency model $$P_{out} = P_{in} \cdot B \cdot e^{-2 \cdot \frac{(x-\Delta x)^2 + (y-\Delta y)^2}{\omega_0^2}} \quad (1)$$

When the light spot position is $(x, y_{11})$, $(x, y_{22})$, $(x, y_{33})$, $(x, y_{44})$, the optical fiber coupling model equation can be written as:

$$\ln \frac{P_{outy_{11}}}{P_{iny_{11}} \cdot B} = -2 \cdot \frac{(x-\Delta x)^2 + (y_{11}-\Delta y)^2}{\omega_0^2} \quad (2)$$

$$\ln \frac{P_{outy_{22}}}{P_{iny_{22}} \cdot B} = -2 \cdot \frac{(x-\Delta x)^2 + (y_{22}-\Delta y)^2}{\omega_0^2} \quad (3)$$

$$\ln \frac{P_{outy_{33}}}{P_{iny_{33}} \cdot B} = -2 \cdot \frac{(x-\Delta x)^2 + (y_{33}-\Delta y)^2}{\omega_0^2} \quad (4)$$

$$\ln \frac{P_{outy_{44}}}{P_{iny_{44}} \cdot B} = -2 \cdot \frac{(x-\Delta x)^2 + (y_{44}-\Delta y)^2}{\omega_0^2} \quad (5)$$

By equation (2) subtracting equation (3), and equation (4) subtracting equation (5) Model can be obtained by:

$$\ln \frac{P_{outy_{11}}}{P_{outy_{22}}} = 2 \cdot \frac{y_{22}^2 - y_{11}^2 + 2 \cdot (y_{11} - y_{22}) \cdot \Delta y}{\omega_0^2} \quad (6)$$

$$\ln \frac{P_{outy_{33}}}{P_{outy_{44}}} = 2 \cdot \frac{y_{44}^2 - y_{33}^2 + 2 \cdot (y_{33} - y_{44}) \cdot \Delta y}{\omega_0^2} \quad (7)$$

Then, by simultaneous equation (6) and equation (7)

$$\ln \frac{P_{outy_{11}}}{P_{outy_{22}}} \cdot [y_{44}^2 - y_{33}^2 + 2 \cdot (y_{33} - y_{44}) \cdot \Delta y]$$

$$= \ln \frac{P_{outy_{33}}}{P_{outy_{44}}} \cdot [y_{22}^2 - y_{11}^2 + 2 \cdot (y_{11} - y_{22}) \cdot \Delta y]$$

It can be obtained by $$\Delta y = \frac{\ln \frac{P_{outy_{11}}}{P_{outy_{22}}} \cdot (y_{44}^2 - y_{33}^2) - \ln \frac{P_{outy_{33}}}{P_{outy_{44}}} \cdot (y_{22}^2 - y_{11}^2)}{\ln \frac{P_{outy_{33}}}{P_{outy_{44}}} \cdot 2 \cdot (y_{11} - y_{22}) - \ln \frac{P_{outy_{11}}}{P_{outy_{22}}} \cdot 2 \cdot (y_{33} - y_{44})} \quad (8)$$

Due to $$\omega_0^2 = 2 \cdot \frac{y_{22}^2 - y_{11}^2 + 2 \cdot (y_{11} - y_{22}) \cdot \Delta y}{\ln \frac{P_{outy_{11}}}{P_{outy_{22}}}} \quad (9)$$

By substituting equation (8) into equation (9), and the coupling model parameters can be obtained.

2) Trajectory Solving the x-axis of the incident light spot is controlled with the use of fast steering mirror to position at two independent positions $(x_1, y_0)$ and $(x_2, y_0)$, and the output optical power values under the two states are recorded respectively by $$P_{outx_1} = P_{in} \cdot B \cdot e^{-2 \cdot \frac{(x-x_1)^2 + (y-y_0)^2}{\omega_0^2}} \quad (10)$$

$$P_{outx_2} = P_{in} \cdot B \cdot e^{-2 \cdot \frac{(x-x_1)^2 + (y-y_0)^2}{\omega_0^2}} \quad (11)$$

Taking the logarithm and subtracting:

$$\ln \frac{P_{outx_1}}{P_{outx_2}} = 2 \cdot \frac{x_2^2 - x_1^2 + 2 \cdot (x_1 - x_2) \cdot x}{\omega_0^2} \quad (12)$$

$$x = \frac{\left[\frac{1}{2} \cdot \ln \frac{P_{outx_1}}{P_{outx_2}} \cdot \omega_0^2 + x_1^2 - x_2^2\right]}{2 \cdot (x_1 - x_2)}$$

Similarly, the y-axis trajectory can be obtained by $$y = \frac{\left[\frac{1}{2} \cdot \ln \frac{P_{outy_1}}{P_{outy_2}} \cdot \omega_0^2 + y_1^2 - y_2^2\right]}{2 \cdot (y_1 - y_2)} \quad (13)$$

3) Error Solving:

As shown in FIG. 5, the received light intensity values Px1, Px2, Py1, Py2 at the nutation trajectory $R_{X1}$, $R_{X2}$, $R_{Y1}$, $R_{Y2}$ can be recorded by;

$$\ln \frac{P_{outx_1}}{P_{inx_1} \cdot B} = -2 \cdot \frac{(Rx_1 - \Delta x)^2 + (Ry - \Delta y)^2}{\omega_0^2} \quad (14)$$

$$\ln \frac{P_{outx_2}}{P_{inx_2} \cdot B} = -2 \cdot \frac{(Rx_2 - \Delta x)^2 + (Ry - \Delta y)^2}{\omega_0^2} \quad (15)$$

$$\ln \frac{P_{outy_1}}{P_{iny_1} \cdot B} = -2 \cdot \frac{(Rx - \Delta x)^2 + (Ry_1 - \Delta y)^2}{\omega_0^2} \quad (16)$$

$$\ln \frac{P_{outy_2}}{P_{iny_2} \cdot B} = -2 \cdot \frac{(Rx - \Delta x)^2 + (Ry_2 - \Delta y)^2}{\omega_0^2} \quad (17)$$

By equation (14) subtracting equation (15), and equation (16) subtracting equation (17)

$$\ln\frac{P_{outx_1}}{P_{outx_2}} = 2 \cdot \frac{Rx_2^2 - Rx_1^2 + 2\cdot(Rx_1 - Rx_2)\cdot\Delta x}{\omega_0^2}$$

$$\ln\frac{P_{outy_1}}{P_{outy_2}} = 2 \cdot \frac{Ry_2^2 - Ry_1^2 + 2\cdot(Ry_1 - Ry_2)\cdot\Delta y}{\omega_0^2}$$

$$E(\Delta x, \Delta y) = \sum \left[ 2 \cdot \frac{\left(Rx_{n+N}^2 - Rx_n^2\right) + 2\cdot(Rx_n - Rx_{n+N})\cdot\Delta x + \left(Ry_{n+N}^2 - Ry_n^2\right) + 2\cdot(Ry_n - Ry_{n+N})\cdot\Delta y}{\omega_0^2} - \ln\frac{P_{out(n)}}{P_{out(n+N)}} \right]$$

$$\Delta x = \ln\frac{P_{outx_1}}{P_{outx_2}} \cdot \frac{\omega_0^2}{8Rx_1}$$

$$\Delta y = \ln\frac{P_{outy_1}}{P_{outy_2}} \cdot \frac{\omega_0^2}{8Ry_1}$$

As mentioned above, a device and method of efficiently coupling spatial light to optical fiber light without a position detector for obtaining a stable optical axis provided by the present invention has the following beneficial effects:

(1) The present invention realizes the high-efficiency coupling spatial light to optical fiber light with a stable optical axis under the circumstance that there is no position detector;

(2) The present invention can independently calculate the coupling model parameters without external provision;

(3) The present invention has a simple structure with stable and reliable performance, which can be easy integrated;

(4) the present invention can obtain high coupling efficiency, has a strong ability to filter out background light, can further improve the anti-interference ability, and can realize a relatively excellent spatial light communication transmission channel.

Figure 1:
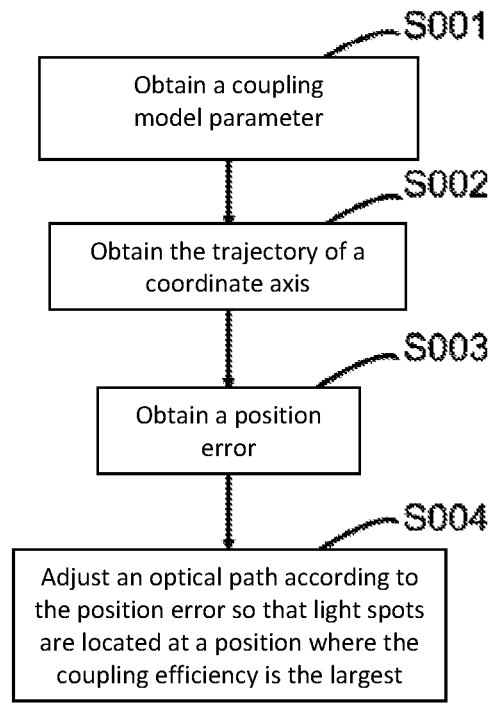
FIG. 1 shows a schematic diagram of steps of a method of efficiently coupling spatial light to optical fiber light without a position detector for obtaining a stable optical axis proposed by the present invention.

laser (01), beam collimator (02), two-dimensional fast scanning galvanometer (03), converging lens group (04), optical fiber coupler (05), drive signal control board (06), signal transmitting module (07), bridge (08), detector (09), data acquisition board (10), optical fiber coupler (11), converging lens group (12), lens barrel (13), lens barrel support (14), piezoelectric ceramic tube (15), coupling base (16), electric wire (17), optical fiber (18).

DETAILED DESCRIPTION

The following specific examples are used to illustrate the implementation of the present invention. Those skilled in the art can easily understand other advantages and effects of the present invention from the content disclosed in this specification.

It should be noted that the structure, proportion, size, etc. shown in the accompanying drawings in this specification are only used for the understanding and reading of those skilled in the art combining the content disclosed in the specification, and are not intended to limit the conditions under which the present invention can be implemented, so it has no technical significance. Any structural modification, proportional relationship change or size adjustment should still fall within the scope of the technical content disclosed in the present invention, without affecting the effects and objectives that the present invention can produce. At the same time, terms such as "upper", "lower", "left", "right", "middle" and "a" quoted in this specification are only for the convenience of description and are not intended to limit the scope of the present invention, and the change or adjustment of its relative relationship shall be regarded as the scope of the implementation of the present invention without substantial change of the technical content. In the following, the method of efficiently coupling spatial light to optical fiber light without a position detector for obtaining a stable optical axis in the present invention will be further described with reference to the accompanying drawings, but the protection scope of the present invention should not be limited by this.

Embodiment 1

The present invention provides a method of efficiently coupling spatial light to optical fiber light without a position detector for obtaining a stable optical axis, and the specific steps are shown in FIG. 1. The method comprises the following four steps:

Step S001: obtaining coupling model parameters.

The laser (01) emits laser light of 1550 nm into the beam collimator (02) through the optical fiber. The emergent light of the beam collimator (02) is incident on the two-dimensional fast scanning galvanometer (03) at an angle of 45 degrees. The light beam reflected by the two-dimensional fast scanning galvanometer (03) is incident on the converging lens group (04) in parallel. The focal point of an emergent light beam of the converging lens group (04) is incident on an end of the optical fiber coupler (05). Under the circumstance of the optical fiber coupler (05) without additional signals, when the two-dimensional fast scanning galvanometer (03) keeps still in the y-direction, it performs a triangular wave scan with an amplitude of 300 mv and a frequency of 2 Hz in the x-direction, then optical power signal of the optical fiber coupler (03) is collected with data length of 10^6. In the same way, when the two-dimensional fast scanning galvanometer (03) keeps still in the x-direction, it performs a triangle wave scan with amplitude of 300 mv and a frequency of 2 Hz in the y-direction, and then the optical power signal of the optical fiber coupler (05) is collected. The sine signal of the two-dimensional fast scanning galvanometer (03) would correspond to the position coordinate of the light spot. The position signal of the two-dimensional fast scanning galvanometer (03) corresponding to each point of the optical power signals collected twice are substituted into equation (1) and equation (2):

$$\ln\frac{P_{outy_{11}}}{P_{outy_{22}}} = 2 \cdot \frac{y_{22}^2 - y_{11}^2 + 2\cdot(y_{11}-y_{22})\cdot\Delta y}{\omega_0^2} \quad (1)$$

$$\ln\frac{P_{outy_{33}}}{P_{outy_{44}}} = 2 \cdot \frac{y_{44}^2 - y_{33}^2 + 2\cdot(y_{33}-y_{44})\cdot\Delta y}{\omega_0^2} \quad (2)$$

Then, equation (3) is obtained $$\Delta y = \frac{\ln\frac{P_{outy_{11}}}{P_{outy_{22}}}\cdot(y_{44}^2-y_{33}^2) - \ln\frac{P_{outy_{33}}}{P_{outy_{44}}}\cdot(y_{22}^2-y_{11}^2)}{\ln\frac{P_{outy_{33}}}{P_{outy_{44}}}\cdot 2\cdot(y_{11}-y_{22}) - \ln\frac{P_{outy_{11}}}{P_{outy_{22}}}\cdot 2\cdot(y_{33}-y_{44})} \quad (3)$$

Due to $$\omega_0^2 = 2\cdot\frac{y_{22}^2 - y_{11}^2 + 2\cdot(y_{11}-y_{22})\cdot\Delta y}{\ln\frac{P_{outy_{11}}}{P_{outy_{22}}}} \quad (4)$$

The coupling model parameter $\omega_0$ can be obtained by substituting equation (3) into equation (4).

Step S000: calibrating a time delay of the two-dimensional fast scanning galvanometer;

Due to the time delay of the two-dimensional fast scanning galvanometer (03) itself, it is necessary to calibrate the delay of the two-dimensional fast scanning galvanometer before calculating the position error.

Sine signals in the X-direction and Y-direction of the fast steering mirror are respectively loaded.

$K=\sin(\theta 1)$

Under the circumstance that the optical fiber nutator is not nutating, the optical fiber nutator outputs sine optical power due to the scanning of the fast steering mirror:

$G=\sin(\theta 2)$

By calculating the phase difference between K and G:

$\Delta=\theta 1-\theta 2$

A delay time of the fast steering mirror can be obtained. For example,
the fast steering mirror is loaded with a sine signal in the X-direction, whose frequency is 20 Hz, and amplitude is 50 mv.

$K=\sin(\theta 1)$

Under the circumstance that the optical fiber nutator is not nutating, the optical fiber nutator outputs sine optical power due to the scanning of the fast steering mirror:

$G=\sin(\theta 2)$

K and G signals are collected through an oscilloscope, with an adoption rate of 2.5 e^5, K and G signals in the time domain are converted to that in the frequency domain with zero padding, that is $K1=fft(K,10^7)$ $G1=fft(G,10^7)$ Then the maximum frequency of the frequency domain signals K1 and G1 are respectively calculated, with the angle corresponding to the maximum frequency is the phase, wherein $K2=\text{angle}(K1(\max))$ $G2=\text{angle}(G1(\max))$ The phase difference in the frequency domain is the time difference in the time domain, so the delay time of the fast steering mirror is $T=K2-G2$ Step S002: obtaining the trajectory of coordinate axis;

The laser (01) emits laser light of 1550 nm into the beam collimator (02) through the optical fiber. The emergent light of the beam collimator (02) is incident on the two-dimensional fast scanning galvanometer (03) at an angle of 45 degrees. The light beam reflected by the two-dimensional fast scanning galvanometer (03) is incident on the converging lens group (04) in parallel. A focal point of an emergent light beam of the converging lens group (04) is incident on an end of the optical fiber coupler (05). The signal transmitting module (07) transmits a quadrature sine signal with signal amplitude of 2.1V and a frequency of 2 kHz. The signal transmitted by the signal transmitting module (07) is transferred to the drive signal control board (06) through coaxial cables. The drive signal control board (06) divides the signals into four sine signals, in which each two sine signals are orthogonal, and amplifies the voltage to 100V at the same time, and then loads the signal onto the optical fiber coupler (05) via electric wires, and the optical fiber coupler (05) is nutated under the action of the amplified orthogonal sine signals. The two-dimensional fast scanning galvanometer (03) is deflected +10 mv and −10 mv in the x-direction under a constant voltage, so as to collect the output coupling optical power at two positions respectively, that is, the output optical power values under two states are recorded when the incident light spot is positioned at two independent positions $(x_1, y0)$ and $(x_2, y0)$ on the x-axis, and then are substituted into equations (5) and (6)

$$P_{outx_1} = P_{in}\cdot B\cdot e^{-2\cdot\frac{(x-x_1)^2+(y-y_0)^2}{\omega_0^2}} \quad (5)$$

$$P_{outx_2} = P_{in}\cdot B\cdot e^{-2\cdot\frac{(x-x_2)^2+(y-y_0)^2}{\omega_0^2}} \quad (6)$$

Taking the logarithm and subtracting:

$$\ln\frac{P_{outx_1}}{P_{outx_2}} = 2\cdot\frac{x_2^2 - x_1^2 + 2\cdot(x_1-x_2)\cdot x}{\omega_0^2}$$

The x-axis trajectory can be obtained $$x = \frac{\left[\frac{1}{2}\cdot\ln\frac{P_{outx_1}}{P_{outx_2}}\cdot\omega_0^2 + x_1^2 - x_2^2\right]}{2\cdot(x_1-x_2)} \quad (7)$$

Similarly, the y-axis trajectory can also be obtained $$y = \frac{\left[\frac{1}{2} \cdot \ln\frac{P_{outy_1}}{P_{outy_2}} \cdot \omega_0^2 + y_1^2 - y_2^2\right]}{2 \cdot (y_1 - y_2)} \quad (8)$$

Step S003: Obtaining the position error;

The laser (01) emits laser light of 1550 nm into the beam collimator (02) through the optical fiber. The emergent light of the beam collimator (02) is incident on the two-dimensional fast scanning galvanometer (03) at an angle of 45 degrees. The light beam reflected by the two-dimensional fast scanning galvanometer (03) is incident on the converging lens group (04) in parallel. A focal point of an emergent light beam of the converging lens group (04) is incident on an end of the optical fiber coupler (05). The signal transmitting module (07) transmits two orthogonal sine signals with signal amplitude of 2.1V and a frequency of 2 kHz. A signal transmitted by the signal transmitting module (07) is transferred to the drive signal control board (06) through coaxial cables. The drive signal control board (06) divides the two signals into four sine signals which are orthogonal for each group of two sine signals and amplifies the voltage to 100V at the same time, and then loads the signal onto the optical fiber coupler (05) via electric wires, and the optical fiber coupler (05) nutates under action of the amplified orthogonal sine signals. The output optical power coupled by the optical fiber coupler (05) enters the bridge (08) via the optical fiber. An optical signal of the bridge (08) enters the detector (09) via the optical fiber. An electrical signal of the detector (09) enters the data acquisition board (10) via coaxial wires.

Figure 5:
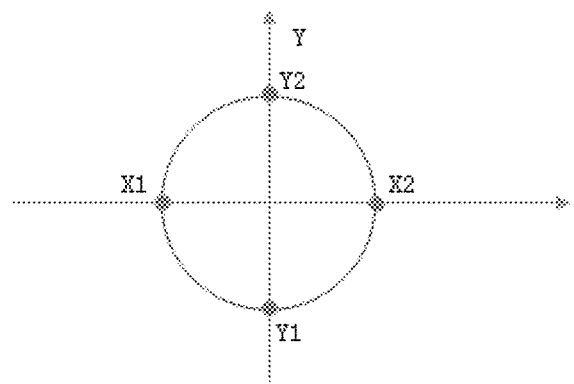
FIG. 5 shows an optical fiber coupling model.

When the nutation frequency is 2 kHz, the nutation period is 500 us, and one collected optical power signal is taken every 125 us, that is, the received light intensity values Px1, Px2, Py1, Py2 at the nutation trajectory $R_{X1}$, $R_{X2}$, $R_{Y1}$, $R_{Y2}$ are recorded;

which can be obtained by the optical fiber coupling model, as shown in FIG. 5

$$\ln\frac{P_{outx_1}}{P_{inx_1} \cdot B} = -2 \cdot \frac{(Rx_1 - \Delta x)^2 + (Ry - \Delta y)^2}{\omega_0^2} \quad (14)$$

$$\ln\frac{P_{outx_2}}{P_{inx_2} \cdot B} = -2 \cdot \frac{(Rx_2 - \Delta x)^2 + (Ry - \Delta y)^2}{\omega_0^2} \quad (15)$$

$$\ln\frac{P_{outy_1}}{P_{iny_1} \cdot B} = -2 \cdot \frac{(Rx - \Delta x)^2 + (Ry_1 - \Delta y)^2}{\omega_0^2} \quad (16)$$

$$\ln\frac{P_{outy_2}}{P_{iny_2} \cdot B} = -2 \cdot \frac{(Rx - \Delta x)^2 + (Ry_2 - \Delta y)^2}{\omega_0^2} \quad (17)$$

Equation (14) subtracts equation (15), and equation (16) subtracts equation (17)

$$\ln\frac{P_{outx_1}}{P_{outx_2}} = 2 \cdot \frac{Rx_2^2 - Rx_1^2 + 2 \cdot (Rx_1 - Rx_2) \cdot \Delta x}{\omega_0^2}$$

$$\ln\frac{P_{outy_1}}{P_{outy_2}} = 2 \cdot \frac{Ry_2^2 - Ry_1^2 + 2 \cdot (Ry_1 - Ry_2) \cdot \Delta y}{\omega_0^2}$$

$$E(\Delta x, \Delta y) = \sum \left[ 2 \cdot \frac{(Rx_{n+N}^2 - Rx_n^2) + 2 \cdot (Rx_n - Rx_{n+N}) \cdot \Delta x +}{\omega_0^2} - \ln\frac{P_{out(n)}}{P_{out(n+N)}} \right]$$

$$\Delta x = \ln\frac{P_{outx_1}}{P_{outx_2}} \cdot \frac{\omega_0^2}{8Rx_1}$$

$$\Delta y = \ln\frac{P_{outy_1}}{P_{outy_2}} \cdot \frac{\omega_0^2}{8Ry_1}$$

That is, the light spot position is $$W = \sqrt{\Delta x^2 + \Delta y^2}$$

The position of the fast steering mirror is the actual position of the fast steering mirror at this time, which can be set as $(k_x, k_y)$ $$W_k = \sqrt{k_x^2 + k_y^2}$$

Finally, the position error is $$\Delta = W(t0) - W_k(t0+T)$$

Due to fiber nutation, there are $-R_{X1}=R_{X2}$, $-R_{Y1}=R_{Y2}$, so in practical applications, $\Delta x$, $\Delta y$ can be either positive or negative.

Step S004: adjusting the optical path according to the position error, so that the light spot is at the position with the maximum coupling efficiency;

Since in step S001 $\omega_0$ has been fitted and calculated, this value is only related to the optical system and fiber mode field distribution, irrespective of anything else, and in principle, this value will not change. $Rx_1$, $Ry_1$ are respectively the nutation radius of the fiber nutation in the x-direction and y-direction, which can be obtained from the nutation trajectory of step S002, so the position error $\Delta x$, $\Delta y$ signals can be obtained through step S003. The position error signals are fed back to the two-dimensional fast scanning galvanometer (03) through the coaxial cable. The two-dimensional fast scanning galvanometer (03) compensates the corresponding error in time, so that the light spot is always fixed at the center of the fiber nutation, which cause system has a stable optical axis.

The invention has the advantage of stable and reliable performance, high coupling efficiency, strong ability to filter out background light, and further improved the anti-interference ability, which can realize a relatively excellent spatial optical communication transmission channel.

Embodiment 2

Figure 2:
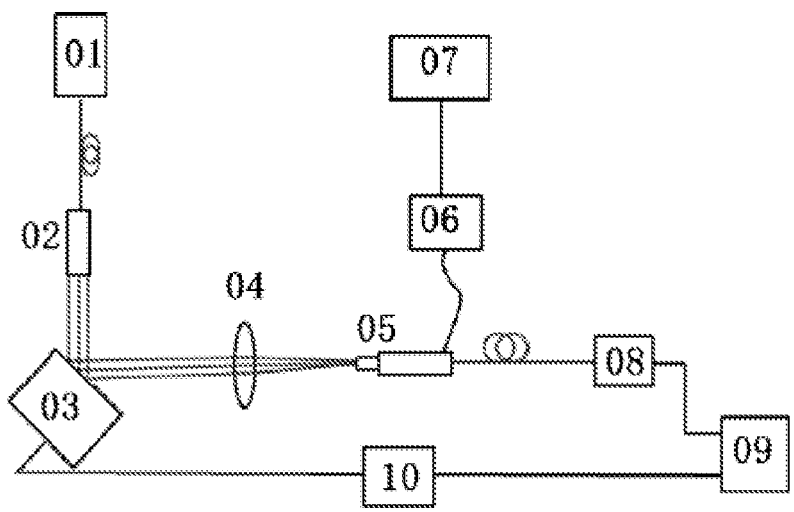
FIG. 2 shows a schematic diagram of a device of efficiently coupling spatial light to optical fiber light without a position detector for obtaining a stable optical axis proposed by the present invention.

The present invention provides a device of efficiently coupling spatial light to optical fiber light without a position detector for obtaining a stable optical axis. As shown in FIG. 2, the device comprises the following components:

The present invention also provides a device of efficiently coupling spatial light to optical fiber light without a position detector for obtaining a stable optical axis, comprising a laser (01), a beam collimator (02), a two-dimensional fast scanning mirror (03), a converging lens group (04), an optical fiber coupler (05), a drive signal control board (06), a signal transmitting module (07), a bridge (08), a detector (09), and a data acquisition board (10).

Specifically, the optical path connection among respective parts is that the laser (01) is connected to a port of the beam collimator (02) through an optical fiber. The emergent light of the beam collimator (02) is incident on the two-dimensional fast scanning galvanometer (03) at an angle of 45 degrees. The light beam reflected by the two-dimensional fast scanning galvanometer (03) converges to an optical center of the converging lens group in parallel and is incident into the converging lens group (04). A focal point of an emergent light beam of the converging lens group (04) is incident on an end of the optical fiber coupler (05). A signal transmitted by the signal transmitting module (07) is transferred to the drive signal control board (06) through coaxial cables. The drive signal control board (06) loads the signal onto the optical fiber coupler (05) via electric wires. The optical power coupled by the optical fiber coupler (05) enters the bridge (08) via the optical fiber. The optical signal of the bridge (08) enters the detector (09) via the optical fiber, and an electrical signal of the detector (09) enters the data acquisition board (10) via coaxial wires.

When coupling of spatial light and optical fiber light so as to form a stable optical axis with the use of present invention, firstly, the laser (01) emits laser light of 1550 nm into the beam collimator (02) through the optical fiber. The emergent light of the beam collimator (02) is incident on the two-dimensional fast scanning galvanometer (03) at an angle of 45 degrees. The light beam reflected by the two-dimensional fast scanning galvanometer (03) is incident on the converging lens group (04) in parallel. A focal point of an emergent light beam of the converging lens group (04) is incident on an end of the optical fiber coupler (05). Under the circumstance of the optical fiber coupler (05) without additional signals, when the two-dimensional fast scanning galvanometer (03) keeps still in the y-direction, it performs a triangular wave scan with an amplitude of 300 mv and a frequency of 2 Hz in the x-direction, then the optical power signal of the optical fiber coupler (03) is collected with data length of 10^6. In the same way, when the two-dimensional fast scanning galvanometer (03) keeps still in the x-direction, it performs a triangle wave scan with an amplitude of 300 mv and a frequency of 2 Hz in the y direction, and then the optical power signal of the optical fiber coupler (05) is collected. The sine signal of the two-dimensional fast scanning galvanometer (03) would correspond to the position coordinate of the light spot. The position signal of the two-dimensional fast scanning galvanometer (03) corresponding to each point of the optical power signals collected twice are substituted into equation (1) and equation (2):

$$\ln\frac{P_{outy_{11}}}{P_{outy_{22}}} = 2 \cdot \frac{y_{22}^2 - y_{11}^2 + 2 \cdot (y_{11} - y_{22}) \cdot \Delta y}{\omega_0^2} \tag{1}$$

$$\ln\frac{P_{outy_{33}}}{P_{outy_{44}}} = 2 \cdot \frac{y_{44}^2 - y_{33}^2 + 2 \cdot (y_{33} - y_{44}) \cdot \Delta y}{\omega_0^2} \tag{2}$$

Then, equation (3) is obtained $$\Delta y = \frac{\ln\frac{P_{outy_{11}}}{P_{outy_{22}}} \cdot (y_{44}^2 - y_{33}^2) - \ln\frac{P_{outy_{33}}}{P_{outy_{44}}} \cdot (y_{22}^2 - y_{11}^2)}{\ln\frac{P_{outy_{33}}}{P_{outy_{44}}} \cdot 2 \cdot (y_{11} - y_{22}) - \ln\frac{P_{outy_{11}}}{P_{outy_{22}}} \cdot 2 \cdot (y_{33} - y_{44})} \tag{3}$$

Due to $$\omega_0^2 = 2 \cdot \frac{y_{22}^2 - y_{11}^2 + 2 \cdot (y_{11} - y_{22}) \cdot \Delta y}{\ln\frac{P_{outy_{11}}}{P_{outy_{22}}}} \tag{4}$$

The coupling model parameter $\omega_0$ can be obtained by substituting equation (3) into equation (4).

Next, the signal transmitting module (07) transmits a quadrature sine signal with signal amplitude of 2.1V and a frequency of 2 kHz. The signal transmitted by the signal transmitting module (07) is transferred to the drive signal control board (06) through coaxial cables. The drive signal control board (06) amplifies the voltage to 100V and loads the signal onto the optical fiber coupler (05) via electric wires, and the optical fiber coupler (05) performs nutation under action of the amplified quadrature sine signal. The two-dimensional fast scanning galvanometer (03) is deflected +10 mv and −10 mv in the x-direction under a constant voltage, so as to collect the output coupling optical power at two positions respectively, that is, the output optical power values under two states are recorded when the incident light spot is positioned at two independent positions $(x_1, y0)$ and $(x_2, y0)$ on the x-axis, and then are substituted into equations (5) and (6)

$$P_{outx_1} = P_{in} \cdot B \cdot e^{-2 \cdot \frac{(x-x_1)^2 + (y-y_0)^2}{\omega_0^2}} \tag{5}$$

$$P_{outx_2} = P_{in} \cdot B \cdot e^{-2 \cdot \frac{(x-x_2)^2 + (y-y_0)^2}{\omega_0^2}} \tag{6}$$

Taking the logarithm and subtracting $$\ln\frac{P_{outx_1}}{P_{outx_2}} = 2 \cdot \frac{x_2^2 - x_1^2 + 2 \cdot (x_1 - x_2) \cdot x}{\omega_0^2}$$

The x-axis trajectory can be obtained $$x = \frac{\left[\frac{1}{2} \cdot \ln\frac{P_{outx_1}}{P_{outx_2}} \cdot \omega_0^2 + x_1^2 - x_2^2\right]}{2 \cdot (x_1 - x_2)} \tag{7}$$

Similarly, the y-axis trajectory can also be obtained $$y = \frac{\left[\frac{1}{2} \cdot \ln\frac{P_{outy_1}}{P_{outy_2}} \cdot \omega_0^2 + y_1^2 - y_2^2\right]}{2 \cdot (y_1 - y_2)} \tag{8}$$

Next, the output optical power coupled by the optical fiber coupler (05) enters the bridge (08) via the optical fiber. The optical signal of the bridge (08) enters the detector (09) via the optical fiber, and an electrical signal of the detector (09) enters the data acquisition board (10) via coaxial wires.

When the nutation frequency is 2 kHz, the nutation period is 500 us, and one collected optical power signal is taken every 125 us, that is, the received light intensity values Px1, Px2, Py1, Py2 at the nutation trajectory $R_{X1}$, $R_{X2}$, $R_{Y1}$, $R_{Y2}$ are recorded;

which can be obtained by the optical fiber coupling model, as shown in FIG. 5

$$\ln\frac{P_{outx_1}}{P_{inx_1} \cdot B} = -2 \cdot \frac{(Rx_1 - \Delta x)^2 + (Ry - \Delta y)^2}{\omega_0^2} \tag{14}$$

$$\ln\frac{P_{outx_2}}{P_{inx_2} \cdot B} = -2 \cdot \frac{(Rx_2 - \Delta x)^2 + (Ry - \Delta y)^2}{\omega_0^2} \tag{15}$$

$$\ln\frac{P_{outy_1}}{P_{iny_1} \cdot B} = -2 \cdot \frac{(Rx - \Delta x)^2 + (Ry_1 - \Delta y)^2}{\omega_0^2} \tag{16}$$

-continued $$\ln\frac{P_{outy_2}}{P_{iny_2} \cdot B} = -2 \cdot \frac{(Rx - \Delta x)^2 + (Ry_2 - \Delta y)^2}{\omega_0^2} \quad (17)$$

Equation (14) subtracts equation (15), and equation (16) subtracts equation (17)

$$\ln\frac{P_{outx_1}}{P_{outx_2}} = 2 \cdot \frac{Rx_2^2 - Rx_1^2 + 2 \cdot (Rx_1 - Rx_2) \cdot \Delta x}{\omega_0^2}$$

$$\ln\frac{P_{outy_1}}{P_{outy_2}} = 2 \cdot \frac{Ry_2^2 - Ry_1^2 + 2 \cdot (Ry_1 - Ry_2) \cdot \Delta y}{\omega_0^2}$$

$$E(\Delta x, \Delta y) = \sum \left[ 2 \cdot \frac{\begin{pmatrix} (Rx_{n+N}^2 - Rx_n^2) + 2 \cdot (Rx_n - Rx_{n+N}) \cdot \Delta x + \\ (Ry_{n+N}^2 - Ry_n^2) + 2 \cdot (Ry_n - Ry_{n+N}) \cdot \Delta y \end{pmatrix}}{\omega_0^2} - \ln\frac{P_{out(n)}}{P_{out(n+N)}} \right]$$

$$\Delta x = \ln\frac{P_{outx_1}}{P_{outx_2}} \cdot \frac{\omega_0^2}{8Rx_1}$$

$$\Delta y = \ln\frac{P_{outy_1}}{P_{outy_2}} \cdot \frac{\omega_0^2}{8Ry_1}$$

The position error signals are fed back to the two-dimensional fast scanning galvanometer (03) through the coaxial cable. The two-dimensional fast scanning galvanometer (03) compensates the corresponding error in time, so that the light spot is always fixed at the center of the fiber nutation, which cause the system has a stable optical axis.

The invention has the advantage of stable and reliable performance, high coupling efficiency, strong ability to filter out background light, and further improved the anti-interference ability, which can realize a relatively excellent spatial optical communication transmission channel.

Embodiment 3

The present invention also provides an optical fiber coupler, which comprises an optical fiber, a piezoelectric ceramic tube, a coupling base, and an electric wire.

Figure 3:
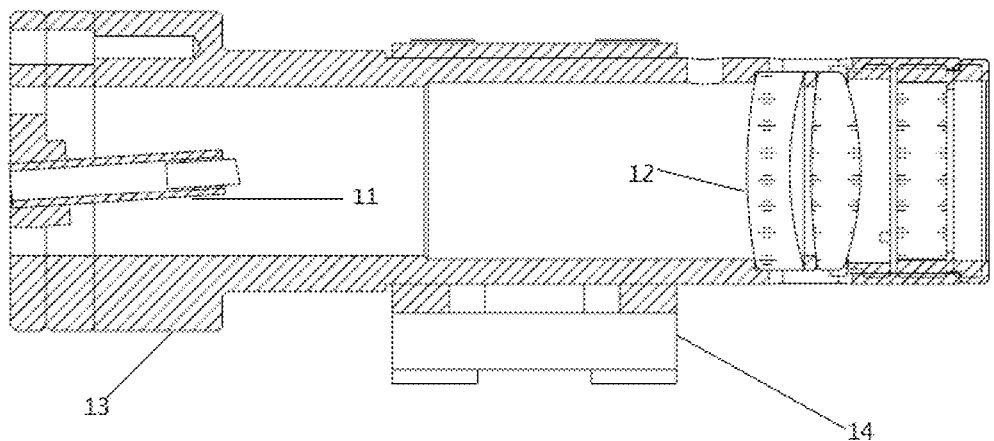
FIG. 3 shows a schematic diagram of the connection structure between an optical fiber coupler and a coupling lens used in the present invention. A chassis of the optical fiber coupler and a converging lens group are fixed in one lens barrel, so that the end face of the fiber is located at the focal point of a lens group.
Figure 4:
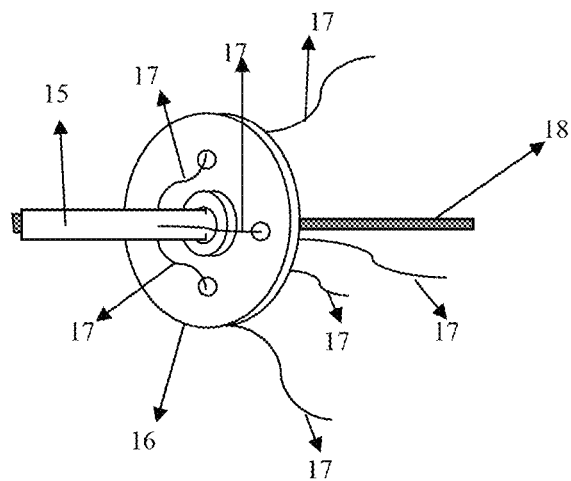
FIG. 4 shows a schematic structural diagram of an optical fiber coupler used in the present invention. The optical fiber is packed into a ceramic tube with the construction of a capillary with a ferrule. A low end of the ceramic tube is fixed to the chassis to form a cantilever structure. There are four electrode regions around the ceramic tube. Four electric wires are extended from the electrode regions near a base, and the electric wires re connected to an external signal drive control board through the base.

As shown in FIG. 3, the optical fiber is structured as a capillary with a ferrule, and an end of the optical fiber is structured as an end cap coating with high permeability film. The outside of the piezoelectric ceramic tube is divided into four strip electrode regions, between which are insulated. The optical fiber is embedded in the piezoelectric ceramic tube, and a bottom end of the piezoelectric ceramic tube is fixed to the coupling base. One end of an electric wire extends from each electrode region of the piezoelectric ceramic tube close to the base portion, and the other end of the electric wire passes through the hole on the base. The whole sites on the base where the electric wires pass through are fixed.

When the optical fiber coupler provided by the present invention is applied to the device of coupling spatial light to optical fiber light without a position detector for obtaining a stable optical axis provided by the present invention, the electric wire connected to the piezoelectric ceramic tube is connected to the signal output port of the signal drive control board, and the signal drive control board outputs electrical signals and loads them on the ceramic tube through the electric wire. When one external voltage is applied to a certain electrode area, the ceramic tube contracts in the vertical direction, causing a relatively large tilt on the top of the ceramic tube. At the same time, the application of voltage will cause the ceramic to expand and contract in the axial direction, so as to achieve the control of the piezoelectric ceramic tube for nutation movement.

What is claimed is:

1. A method of coupling spatial light to optical fiber light without a position detector for obtaining a stable optical axis, which is applied to a device comprising an optical fiber coupler and a two-dimensional fast scanning galvanometer, wherein the method comprises at least the following steps:

Step S002: the optical fiber coupler is nutated under action of an amplified orthogonal sine signal, and the two-dimensional fast scanning galvanometer is deflected to two preset positions in x-direction and y-direction under constant voltage, and an output coupling optical power of each position is collected respectively, and x-axis and y-axis trajectories on a nutation circumference are obtained according to the optical power;

Step S003: the optical fiber coupler is nutated under the action of the amplified orthogonal sine signal, an optical power signal is collected every preset nutation period, and a position error signal is obtained according to the collected optical power signal and its corresponding coordinate value; and Step S004: an optical path is adjusted according to the position error signal, thereby obtaining the stable optical axis.

2. The method of coupling spatial light to optical fiber light without a position detector for obtaining a stable optical axis of claim 1, wherein before the step S002, it further comprises:

Step S001: coupling model parameters are obtained; and the step S001 comprises at least the following steps:

S001*a*: the two-dimensional fast scanning galvanometer keeps still in the y-direction, and performs a triangular wave scan in the x-direction, then the optical power signal of the optical fiber coupler is collected; the two-dimensional fast scanning galvanometer keeps still in the x-direction, and performs a triangle wave scan in the y-direction to collect the optical power signal of the optical fiber coupler;

S001*b*: substituting the optical power signal collected twice in S001*a* and the position signal of the two-dimensional fast scanning galvanometer corresponding to each signal point into an equation to calculate coupling model parameters.

3. The method of coupling spatial light to optical fiber light without a position detector for obtaining a stable optical axis of claim 2, wherein after the step S001 and before the step S002, the method comprises the following steps:

S002*a*: a signal transmitting module is controlled to transmit two orthogonal sine signals;

S002*b*: a drive signal control board divides an input signal into four amplified sine signals which are orthogonal for each group of two sine signals;

S002*c*: the drive signal control board loads signals onto the optical fiber coupler via electric wires, and the optical fiber coupler is nutated under action of the amplified orthogonal sine signals.

4. The method of coupling spatial light to optical fiber light without a position detector for obtaining a stable optical axis of claim 3, wherein an amplitude of the sine signal emitted by the signal transmitting module in step S002*a* is in a range of 1V-2.5V, and a frequency is in a range of 1 kHz-5 kHz.

5. The method of coupling spatial light to optical fiber light without a position detector for obtaining a stable optical axis of claim 3, wherein the drive signal control board in step S002c amplifies a voltage into 100V-200V.

6. The method of coupling spatial light to optical fiber light without a position detector for obtaining a stable optical axis of claim 1, wherein the step S003 comprises at least one of the following steps:

S003a: a signal transmitting module is controlled to transmit two orthogonal sine signals;

S003b: a drive signal control board divides an input signal into four amplified sine signals which are orthogonal for each group of two sine signals;

S003c: the drive signal control board loads the signals onto the optical fiber coupler via electric wires, and the optical fiber coupler is nutated under action of the amplified orthogonal sine signals;

S003d: an optical power signal is collected every a quarter of nutation period;

S003e: substituting the collected optical power signal and its corresponding coordinate value into an equation to obtain a position error signal.

7. The method of coupling spatial light to optical fiber light without a position detector for obtaining a stable optical axis of claim 1, wherein a calculated x-axis trajectory is:

$$x = \frac{\left[\frac{1}{2} \cdot \ln \frac{P_{outx_1}}{P_{outx_2}} \cdot \omega_0^2 + x_1^2 - x_2^2\right]}{2 \cdot (x_1 - x_2)};$$

and a y-axis trajectory is:

$$y = \frac{\left[\frac{1}{2} \cdot \ln \frac{P_{outy_1}}{P_{outy_2}} \cdot \omega_0^2 + y_1^2 - y_2^2\right]}{2 \cdot (y_1 - y_2)};$$

wherein, $x_1$, $x_2$ are x coordinates of two preset positions in the x-direction, $y_1$, $y_2$ are y coordinates of two preset positions in the y-direction, $\omega_0$ is a coupling model parameter, $P_{outx1}$ is an output optical power corresponding to the position $x_1$, $P_{outx2}$ is an output optical power corresponding to the position $x_2$, $P_{outy1}$ is an output optical power corresponding to the position $y_1$, and $P_{outy2}$ is an output optical power corresponding to the position $y_2$.

8. The method of coupling spatial light to optical fiber light without a position detector for obtaining a stable optical axis of claim 1, wherein error positions are:

$$\Delta x = \ln \frac{P_{outx_1}}{P_{outx_2}} \cdot \frac{\omega_0^2}{8Rx_1}$$

$$\Delta y = \ln \frac{P_{outy_1}}{P_{outy_2}} \cdot \frac{\omega_0^2}{8Ry_1}$$

wherein, $Rx_1$ is the x coordinate on the x-direction trajectory, $Ry_1$ is the coordinate on the y-direction trajectory, $\omega_0$ is the coupling model parameter, $P_{outx1}$ is an output optical power corresponding to the position $Rx_1$, $P_{outx2}$ is an output optical power corresponding to the position $Rx_2$, $P_{outy1}$ is an output optical power corresponding to the position $y_1$, and $P_{outy2}$ is an output optical power corresponding to the position $Ry_2$.

9. The method of coupling spatial light to optical fiber light without a position detector for obtaining a stable optical axis of claim 1, wherein, before the step S003 or the step S002, the method further comprises:

Step S000: a time delay of the two-dimensional fast scanning galvanometer is calibrated; specifically, Step S000 comprises the following steps:

Step S000a: a sine signal $K=\sin(\theta_1)$ in the X and Y directions of a fast steering mirror is loaded respectively;

Step S000b: when the optical fiber is not nutating, a sine optical power $G=\sin(\theta_2)$ output by an optical fiber nutator is calculated due to the scanning of a fast steering mirror, Step S000c: by calculating a phase difference between K and G $\Delta = \theta_1 - \theta_2$ a delay time of the fast steering mirror can be obtained.

10. A device of coupling spatial light to optical fiber light without a position detector for obtaining a stable optical axis, which is configured to perform a method of coupling spatial light to optical fiber light without a position detector for obtaining a stable optical axis according to claim 1.

11. The device of claim 10, comprising: a laser (01), a beam collimator (02), a two-dimensional fast scanning galvanometer (03), a converging lens group (04), an optical fiber coupler (05), a drive signal control board (06), a signal transmitting module (07), a bridge (08), a detector (09), and a data acquisition board (10);

the laser (01) is connected to a port of the beam collimator (02) through an optical fiber, emergent light of the beam collimator (02) is incident on the two-dimensional fast scanning galvanometer (03) at an angle of 45 degrees, a light beam reflected by the two-dimensional fast scanning galvanometer (03) converges to an optical center of the converging lens group in parallel and is incident into the converging lens group (04), a focal point of an emergent light beam of the converging lens group (04) is incident on an end of the optical fiber coupler (05), a signal transmitted by the signal transmitting module (07) is transferred to the drive signal control board (06) through coaxial cables, the drive signal control board (06) loads the signal onto the optical fiber coupler (05) via electric wires, the optical power coupled by the optical fiber coupler (05) enters the bridge (08) via the optical fiber, an optical signal of the bridge (08) enters the detector (09) via the optical fiber, and an electrical signal of the detector (09) enters the data acquisition board (10) via coaxial wires.

12. The device of claim 11, wherein the optical fiber coupler (05) comprises an optical fiber (11), and a piezoelectric ceramic tube (12).

13. The device of claim 12, wherein the optical fiber (11) passes through the piezoelectric ceramic tube (12) and is fixed to the piezoelectric ceramic tube (12).

14. The device of claim 13, wherein the piezoelectric ceramic tube (12) includes four electrode regions (13), and electric wires (14) are welded on each of the four electrode regions (13).

15. The device of coupling spatial light to optical fiber light without a position detector for obtaining a stable optical axis of claim 11, wherein the signal transmitting module (07) is a signal generator.

16. The device of coupling spatial light to optical fiber light without a position detector for obtaining a stable optical axis of claim 11, wherein the drive signal control board (06) is a voltage amplifier.

17. The device of coupling spatial light to optical fiber light without a position detector for obtaining a stable optical axis of claim 11, wherein the optical fiber coupler comprises an optical fiber, a piezoelectric ceramic tube, a coupling base, and a electric wire;

the optical fiber is structured as a capillary with a ferrule;

the outside of the piezoelectric ceramic tube is divided into several strip electrode regions which are insulated from each other;

the coupling base has holes;

the optical fiber is embedded in the piezoelectric ceramic tube, a bottom end of the piezoelectric ceramic tube is fixed to the coupling base, one electric wire extends from each electrode region of the piezoelectric ceramic tube close to the base portion, and the other end of the electric wire passes through the hole on the base.

18. The device of coupling spatial light to optical fiber light without a position detector for obtaining a stable optical axis of claim 17, wherein an end face of one end of the optical fiber has an end cap coating with high permeability film.

19. The device of coupling spatial light to optical fiber light without a position detector for obtaining a stable optical axis of claim 17, wherein the number of the strip electrode regions is four.

\* \* \* \* \*